United States Patent
Du et al.

(10) Patent No.: US 11,790,534 B2
(45) Date of Patent: Oct. 17, 2023

(54) ATTENTION-BASED JOINT IMAGE AND FEATURE ADAPTIVE SEMANTIC SEGMENTATION METHOD

(71) Applicant: WUHAN UNIVERSITY, Hubei (CN)

(72) Inventors: Bo Du, Hubei (CN); Juhua Liu, Hubei (CN); Qihuang Zhong, Hubei (CN); Lifang'an Xiao, Hubei (CN)

(73) Assignee: WUHAN UNIVERSITY, Hubei (CN)

( * ) Notice: Subject to any disclaimer, the term of this patent is extended or adjusted under 35 U.S.C. 154(b) by 0 days.

(21) Appl. No.: 18/317,928

(22) Filed: May 16, 2023

(65) Prior Publication Data

US 2023/0281828 A1 Sep. 7, 2023

Related U.S. Application Data

(63) Continuation-in-part of application No. PCT/CN2021/122344, filed on Sep. 30, 2021.

(30) Foreign Application Priority Data

Apr. 26, 2021 (CN) .......................... 202110452783.7

(51) Int. Cl.
*G06T 7/00* (2017.01)
*G06T 7/174* (2017.01)
(Continued)

(52) U.S. Cl.
CPC ................ *G06T 7/174* (2017.01); *G06T 1/20* (2013.01); *G06T 7/11* (2017.01); *G06V 10/764* (2022.01);
(Continued)

(58) Field of Classification Search
CPC ... G06T 7/174; G06T 1/20; G06T 7/11; G06T 2207/20004; G06T 2207/20081;
(Continued)

(56) References Cited

U.S. PATENT DOCUMENTS

| | | |
|---|---|---|
| 2020/0027545 A1 | 1/2020 | Xie et al. |
| 2020/0401938 A1 | 12/2020 | Etkin et al. |

(Continued)

FOREIGN PATENT DOCUMENTS

| | | |
|---|---|---|
| CN | 110322446 | 10/2019 |
| CN | 111080628 | 4/2020 |

(Continued)

OTHER PUBLICATIONS

Cheng Chen et al., "Synergistic Image and Feature Adaptation: Towards Cross-Modality Domain Adaptation for Medical Image Segmentation," The Thirty-Third AAAI Conference on Artificial Intelligence (AAAI-19), Jan. 2019, pp. 865-872.

(Continued)

*Primary Examiner* — Ping Y Hsieh
(74) *Attorney, Agent, or Firm* — JCIP GLOBAL INC.

(57) ABSTRACT

The invention discloses an attention-based joint image and feature adaptive semantic segmentation method. First, the image adaptation procedure is used to transform the source domain image $X_s$ to a target-domain-like image $X_{s-t}$ with an appearance similar with the target domain image $X_t$, to reduce the domain gap between the source domain and the target domain at the image appearance level; then using the feature adaptation procedure to align the features between $X_{s-t}$ and $X_t$ in the semantic prediction space and the image generation space, respectively, to extract the domain-invariant features, to reduce the domain difference between $X_{s-t}$ and $X_t$. In addition, the present invention introduces an attention module in the feature adaptation procedure to help the feature adaptation procedure pay more attention to image regions worthy of attention. Finally, combining the image adaptation procedure and the feature adaptation procedure in the end-to-end manner. The present invention effectively solves the problem of domain gap existing in the cross- (Continued)

modal image semantic segmentation, improves the performance of the semantic segmentation model, and achieves the optimal effect in multiple public data sets.

11 Claims, 4 Drawing Sheets

(51) Int. Cl.
*G06V 10/82* (2022.01)
*G06V 10/774* (2022.01)
*G06V 10/764* (2022.01)
*G06T 1/20* (2006.01)
*G06T 7/11* (2017.01)

(52) U.S. Cl.
CPC ............ *G06V 10/774* (2022.01); *G06V 10/82* (2022.01); *G06T 2207/20004* (2013.01); *G06T 2207/20081* (2013.01); *G06T 2207/20084* (2013.01)

(58) Field of Classification Search
CPC ........ G06T 2207/20084; G06V 10/764; G06V 10/774; G06V 10/82
See application file for complete search history.

(56) References Cited

U.S. PATENT DOCUMENTS

| 2021/0089807 | A1  | 3/2021 | Lu et al. |
| 2022/0044394 | A1* | 2/2022 | Harrison ................ G16H 50/20 |
| 2022/0180126 | A1* | 6/2022 | Yan ....................... G06V 10/761 |
| 2022/0309667 | A1* | 9/2022 | Yoo ........................ G06T 7/0016 |

FOREIGN PATENT DOCUMENTS

| CN | 111275713 | 6/2020 |
| CN | 111275714 | 6/2020 |
| CN | 112016592 | 12/2020 |
| CN | 112288739 | 1/2021 |
| WO | 2020156303 | 8/2020 |

OTHER PUBLICATIONS

Cheng Chen et al., "Unsupervised Bidirectional Cross-Modality Adaptation via Deeply Synergistic Image and Feature Alignment for Medical Image Segmentation," IEEE Transactions on Medical Imgaging, Feb. 2020, pp. 1-12.

"International Search Report (Form PCT/ISA/210) of PCT/CN2021/122344," dated Feb. 9, 2022, with English translation thereof, pp. 1-6.

"Search Report of China Counterpart Application", with English Translation thereof, dated Mar. 10, 2022, p. 1-p. 5.

* cited by examiner

ATTENTION-BASED JOINT IMAGE AND FEATURE ADAPTIVE SEMANTIC SEGMENTATION METHOD

CROSS-REFERENCE TO RELATED APPLICATION

This is a continuation-in-part application of International Application No. PCT/CN2021/122344, filed on Sep. 30, 2021, which claims the priority benefits of China Application No. 202110452783.7, filed on Apr. 26, 2021. The entirety of each of the above-mentioned patent applications is hereby incorporated by reference herein and made a part of this specification.

BACKGROUND

Technical Field

The present invention belongs to the field of natural scene image semantic segmentation technology, and specifically relates to an attention-based joint image and feature adaptive semantic segmentation method.

Description of Related Art

With the proposed and rapid development of deep learning technology, image semantic segmentation methods based on deep learning have become more and more mature. However, because pixel-level labeling of images requires certain expertise and extremely high labor cost, it is difficult to obtain image semantic segmentation datasets with sufficient labeled samples, which greatly limits the performance of semantic segmentation models. Currently, the main approach in the industry to deal with this problem is the cross-modal training strategy. Specifically, considering that there are multiple imaging modalities, the number of samples and the difficulty of annotation differ between different modal images obtained from different imaging modalities, for example, the annotation difficulty of MRI (magnetic resonance imaging) images in the medical field is lower than that of CT (computed tomography) images, and the number of MRI annotated samples that can be obtained is significantly higher than that of CT annotated samples. Therefore, the cross-modal semantic segmentation is first pretrained on the source modality dataset (source domain), which is rich in annotation samples, and then the pretrained model is used to perform semantic segmentation on the target modality dataset (target domain), which is sparse in annotation samples, to obtain pixel-level segmentation results. However, the severe domain gaps between the source domain and the target domain lead to the difficulty of achieving the desired results on the target domain for the image segmentation model obtained by pretraining on the source domain.

To solve the above-mentioned problem of domain gaps in cross-modal semantic segmentation, the industry deals with it in two main ways: image adaptation and feature adaptation. Image adaptation methods reduce the domain gap between the source domain and the target domain by eliminating the image appearance difference between the source domain image and the target domain image. Specifically, the image adaptation method first trains on the source domain dataset to obtain an image segmentation model, then transforms the unlabeled target domain dataset into a source domain-like dataset by an image transformation method, and finally uses the previously trained image segmentation model to perform image segmentation on the transformed source-domain-like dataset. Unlike image adaptation methods, feature adaptation methods obtain domain-invariant features by aligning the feature space between the source domain and the target domain, thus reducing domain gaps at the feature level. Most current methods are either based on image adaptation or feature adaptation, while ignoring the collaboration between both procedures. In addition, although a few methods try to combine these two kinds of adaptation, they simply combine them in a sequential manner and do not fully exploit their effects.

SUMMARY

In view of the shortcomings of existing technologies, this invention provides an attention-based joint image and feature adaptive semantic segmentation method. The method uses an image adaptation procedure and a feature adaptation procedure to gradually reduce the domain gaps between source domain images and target domain images in terms of image appearance and feature space, respectively. Additionally, an attention module is introduced into the feature adaptation procedure to capture the key features of important regions. Lastly, the image adaptation procedure and feature adaptation procedure are combined together in an end-to-end manner to fully exploit the collaboration between both procedures. This method can effectively alleviate the domain gap problem in cross-modal semantic segmentation and thus effectively improve the performance of image semantic segmentation models.

To achieve the above-mentioned purpose of the invention, the technical solution used in the present invention is: an attention-based joint image and feature adaptive semantic segmentation method, wherein an adaptive joint framework for cross-modal image semantic segmentation domain is constructed, including an image adaptation procedure and a feature adaptation procedure, the image adaptation procedure and the feature adaptation procedure are adopted to gradually reduce a domain gap between source domain images and target domain images from two aspects of an image appearance and a feature space respectively. Additionally, an attention module is introduced into the feature adaptation procedure to capture key features of important regions. Lastly, the image adaptation procedure and the feature adaptation procedure are combined in an end-to-end manner. Specifically, the attention-based joint image and feature adaptive semantic segmentation method contains the following steps:

Step (1), using the image adaptation procedure to transform an image style of the source domain images, and without changing an image content, transforming the source domain images into target-like images with an appearance similar with the target domain images;

Step (2), using the feature adaptation procedure to align the features between the target-like images and the target images in a semantic prediction space and an image generation space respectively, to extract the domain-invariant features;

Step (3), introducing an attention module into the feature adaptation procedure, wherein the attention module consists of a pooling layer, an upsampling layer, a convolution layer and a Sigmoid activation layer;

Step (4), combining the image adaptation procedure and the feature adaptation procedure in an end-to-end manner to obtain a domain self-adaptive joint framework, with which a high-performance image segmentation model can be robustly trained.

Further, in step (1), the specific implementation of using the image adaptation procedure to transform the image style on the source domain image is as follows:

11) Firstly, a source domain image $X_s$ is inputted into a generator $G_T$ of a generative adversarial network (GAN) to generate a target-domain-like image $X_{s-t}$, and a discriminator $D_T$ (corresponding to $G_T$) in the generative adversarial network is used to discriminate $X_{s-t}$, to judge whether the image is a real target domain image or a transformed target-domain-like image. The loss function $\mathcal{L}_{GAN}^T$ of the GAN is formulated as shown in Equation (1):

$$\mathcal{L}_{GAN}^T(G_T,D_T,SD,TD) = \mathbb{E}_{X_t \sim TD}[\log D_T(X_t)] + \mathbb{E}_{X_s \sim SD}[\log(1 - D_T(G_T(X_s)))] \quad (1)$$

wherein SD and TD denote the source domain dataset and target domain dataset, respectively, and $X_t$ is the real target domain image.

12) Then, the target domain image $X_t$ is fed into another generator $G_S$, to transform the target image $X_t$ to the source-domain-like image $X_{t-s}$, and a corresponding discriminator $D_S$ is used for discrimination, different from the generator $G_T$ in step 11), the generator $G_S$ is composed of two separate network modules, i.e., $G_S = F \circ T$, wherein F and T denote the feature extractor and the feature decoder respectively. The loss function $\mathcal{L}_{GAN}^S$ in this process is shown in Equation (2):

$$\mathcal{L}_{GAN}^S(F,T,D_S,TD,SD) = \mathbb{E}_{X_s \sim SD}[\log D_S(X_S)] + \mathbb{E}_{X_t \sim TD}[\log(1 - D_T(T(F(X_t))))] \quad (2)$$

13) The image transformation procedure is guided by a cycle-consistency constraint $\mathcal{L}_{cyc}$. Specifically, the cycle-consistency constraint is divided into a forward consistency constraint and a backward consistency constraint, wherein the forward consistency constraint ensures that the image $X_s$ can return to the image $X_s$ through image transformation after the image $X_s$ is transformed to $X_{s-t}$ as: $X_s \rightarrow G_T(X_s) = X_{s-t} \rightarrow T(F(G_T(X_s))) = X_{s-t-s}$. Similarly, the backward consistency constraint ensures that the image $X_t$ can return to the image $X_t$ through image transformation after the image $X_t$ is transformed to $X_{t-s}$ as: $X_t \rightarrow T(F(X_t)) = X_{t-s} \rightarrow G_T(T(F(X_t))) = X_{t-s-t}$. The cycle-consistency constraint $\mathcal{L}_{cyc}$ is shown in Equation (3):

$$\mathcal{L}_{cyc}^1(G_T,F,T,SD) = \mathbb{E}_{X_s \sim SD}[\|T(F(G_T(X_s))) - X_s\|_1]$$

$$\mathcal{L}_{cyc}^2(G_T,F,T,TD) = \mathbb{E}_{X_s \sim SD}[\|G_T(T(F(X_t))) - X_t\|_1]$$

$$\mathcal{L}_{cyc}(G_T,F,T,SD,TD) = \mathcal{L}_{cyc}^1(G_T,F,T,SD) + \mathcal{L}_{cyc}^2(G_T,F,T,TD) \quad (3)$$

wherein $\mathcal{L}_{cyc}^1$ and $\mathcal{L}_{cyc}^2$ denote the forward consistency constraint and the backward consistency constraint, respectively; $\|\cdot\|_1$ denotes the L1 norm;

14) Lastly, after obtaining the target-domain-like image $X_{s-t}$, inputting the target-domain-like image $X_{s-t}$ to the segmentation network for training. Specifically, the segmentation network is composed of the feature extractor F used in the above process and the newly introduced classifier C, which can be represented as $F \circ C$. Then, the segmentation model can be trained by using $X_{s-t}$ and its corresponding label $Y_s$. The objective function of the segmentation model is formulated as Equation (4):

$$\mathcal{L}_{seg}(F,C,SD) = CE(Y_s,P_{s-t}) + Dice(Y_s,P_{s-t}) \quad (4)$$

wherein CE(•) represents the cross-entropy loss, Dice(•) represents the Dice loss, and $P_{s-t}$ is the prediction result of the segmentation model.

Further, the described generator $G_T$ is composed of 3 convolution layers, 9 residual blocks, 2 deconvolution layers and 1 convolution layer.

Further, the described discriminator $D_T$ is composed of 3 convolution layers with a step size of 2 and 2 convolution layers with a step size of 1, and the convolution kernel sizes are all 4*4. The network structure of the discriminator $D_S$ is the same as $D_T$.

Further, the described feature extractor F can be represented as {C, R, P, R, P, 2×R, P, 2×R, 4×R, 2×R, 2×D, 2×C}, wherein {C, R, P, D} denote the convolution layer, the residual block, the maximum pooling layer, and the dilated convolution layer, respectively.

Further, the described feature decoder T includes 1 convolution layer, 4 residual blocks, 3 deconvolution layers and 1 convolution layer; the classifier C is only composed of a 1×1 convolution layer.

Further, in step (2), the specific implementation of using the feature adaptation procedure to extract the domain-invariant features is as follows:

21) In order to further reduce the domain gap between the transformed target-domain-like image $X_{s-t}$ and the target domain image $X_t$, aligning the feature space between $X_{s-t}$ and $X_t$ from two aspects, and learn the domain-invariant features. Specifically, the feature space corresponding to the two aspects is a semantic prediction space and an image generation space, respectively.

22) In the semantic prediction space, the feature extractor F is used to extract features of $X_{s-t}$ and $X_t$, respectively. The extracted features are fed into the classifier C to perform a pixel-level label prediction so as to obtain a predicted segmentation result of $X_{s-t}$ and $X_t$. Then, an additional discriminator $D_P$ is used to discriminate the two prediction results to distinguish the difference between them. The loss function of this process is denoted as $\mathcal{L}_{GAN}^P$, which is formulated as Equation (5):

$$\mathcal{L}_{GAN}^P(F,C,D_P) = \mathbb{E}_{X_{s-t}}[\log D_P(C(F(X_{s-t})))] + \mathbb{E}_{X_t}[\log(1 - D_P(C(F(X_t))))] \quad (5)$$

23) In the image generation space, for the generator $G_S = F \circ T$, an auxiliary task is added for the corresponding discriminator $D_S$ to judge whether the generated source domain image is from the generated target domain image $X_{S-t}$ or from the real target domain image $X_t$. The auxiliary task can promote the feature extractor F to extract common features between the source domain and the target domain, thereby reducing the domain gap between the source domain and the target domain at the feature level. The loss function of this process is referred to as $\mathcal{L}_{GAN}^{\tilde{S}}$, which is shown in Equation (6):

$$\mathcal{L}_{GAN}^{\tilde{S}}(F,T,D_S) = \mathbb{E}_{X_{s-t}}[\log D_S(T(F(X_{S-t})))] + \mathbb{E}_{X_t}[\log(1 - D_T(T(F(X_t))))] \quad (6)$$

Further, the described discriminator $D_P$ is composed of 3 convolution layers with a step size of 2 and 2 convolution layers with a step size of 1, and the convolution kernel sizes are all 4*4.

Further, in step (3), the specific implementation of introducing the attention module in the feature adaptation procedure is as follows:

31) An attention module is introduced in the feature adaptation procedure to help it extract the attention-aware features. Specifically, the features extracted by the feature extractor F are firstly input to the maximum pooling layer with a size of 2×2 for down-sampling, and then a bilinear interpolation is used for up-sampling;

32) The upsampled result are fed into a convolution layer with a convolution kernel size of 1×1, and is further processed by a Sigmoid activation function to obtain the attention-aware map A(•).

33) Finally, the output result of the attention module is obtained according to the attention-aware map, which is formulated as Equation (7):

$$H(X)=(1+A(X))*F(X) \qquad (7)$$

wherein X represents the input image; F (X) represents the features extracted by the feature extractor; A(X) represents the obtained attention-aware map; and H(X) represents the features of the final output. The value range of A(X) is [0, 1], wherein in the lesion image area, the attention weight tends to be 1, and the attention weight of the background area tends to be 0.

Further, in step (4), the specific implementation for constructing the domain self-adaptive joint framework in an end-to-end manner is as follows:

41) The domain self-adaptive joint framework is obtained by connecting the image adaptation procedure and the feature adaptation procedure in an end-to-end manner, wherein the end-to-end connection manner is:: firstly, inputting a source domain image and a target domain image into the image adaptation procedure to obtain a target-domain-like image and a real target domain image which are similar in image style, and then inputting the target-domain-like image and the real target domain image into the feature adaptation procedure. Finally, the prediction result of image semantic segmentation in the target domain is outputted. Specifically, more robust features can be captured by F through the multi-task learning strategy, so that the image adaptation and feature adaptation can benefit from each other. The objective function $\mathcal{L}_{all}$ of the joint framework is formulated as Equation (8):

$$\mathcal{L}_{all}=\mathcal{L}_{GAN}^T(G_T,D_T,SD,TD)+\lambda^S \mathcal{L}_{GAN}^S(F,T,D_S,TD,$$
$$SD)+\lambda_{cyc}\mathcal{L}_{cyc}(G_T,F,T,SD,TD)+\lambda_{seg}\mathcal{L}_{seg}(F,C,$$
$$SD)+\lambda^P \mathcal{L}_{GAN}^P(F,C,D_P)+\lambda^{\tilde{S}} \mathcal{L}_{GAN}^{\tilde{S}}(F,T,D_S) \qquad (8)$$

wherein $\lambda^S$, $\lambda_{cyc}$, $\lambda_{seg}$, $\lambda^P$, $\lambda^{\tilde{S}}$ are balancing parameters used to balance each objective function;

42) With the gradient backward propagation of the joint framework, the update sequence of each module is expressed as $G_T \Rightarrow D_T \Rightarrow F \Rightarrow C \Rightarrow T \Rightarrow D_S \Rightarrow D_P$. Firstly, the generator $G_T$ and the discriminator $D_T$ are updated to obtain a target-domain-like image; next, the feature extractor F is updated to extract features from the target-domain-like image; then, the classifier C and the feature decoder T are updated, and the extracted features are used for semantic segmentation prediction and image reconstruction respectively; Finally, the discriminators $D_S$ and $D_P$ are updated to learn the domain-invariant features between the source domain and the target domain.

Compared with existing techniques, the advantages and beneficial effects of the present invention are:

1) Compared with existing techniques based on image adaptation or feature adaptation, the present invention proposes a domain adaptive framework that combines both image adaptation and domain adaptation, and effectively combines both together in an end-to-end manner to improve the training efficiency while making both gain from each other, thus achieving better domain adaptation.

2) To further enhance the method effectiveness, the present invention introduces a novel attention module, and the attention module helps the model focus on the lesion or organ region that deserves attention by enhancing the features of the lesion or organ region to improve the feature adaptation effect and the performance of the final segmentation model.

3) Compared with existing techniques, the method proposed in the present invention can effectively solve the problem of domain gaps in cross-modal image semantic segmentation and effectively improve the performance of the image semantic segmentation model, achieving optimal results in multiple publicly available datasets.

DESCRIPTION OF THE EMBODIMENTS

In order to facilitate the understanding and implementation of the present invention by a person of ordinary skill in the art, the present invention is described in further detail below in conjunction with the accompanying drawings and examples of embodiments. It should be understood that the embodiments described herein are intended only to illustrate and explain the present invention and are not intended to limit the present invention.

Figure 1:
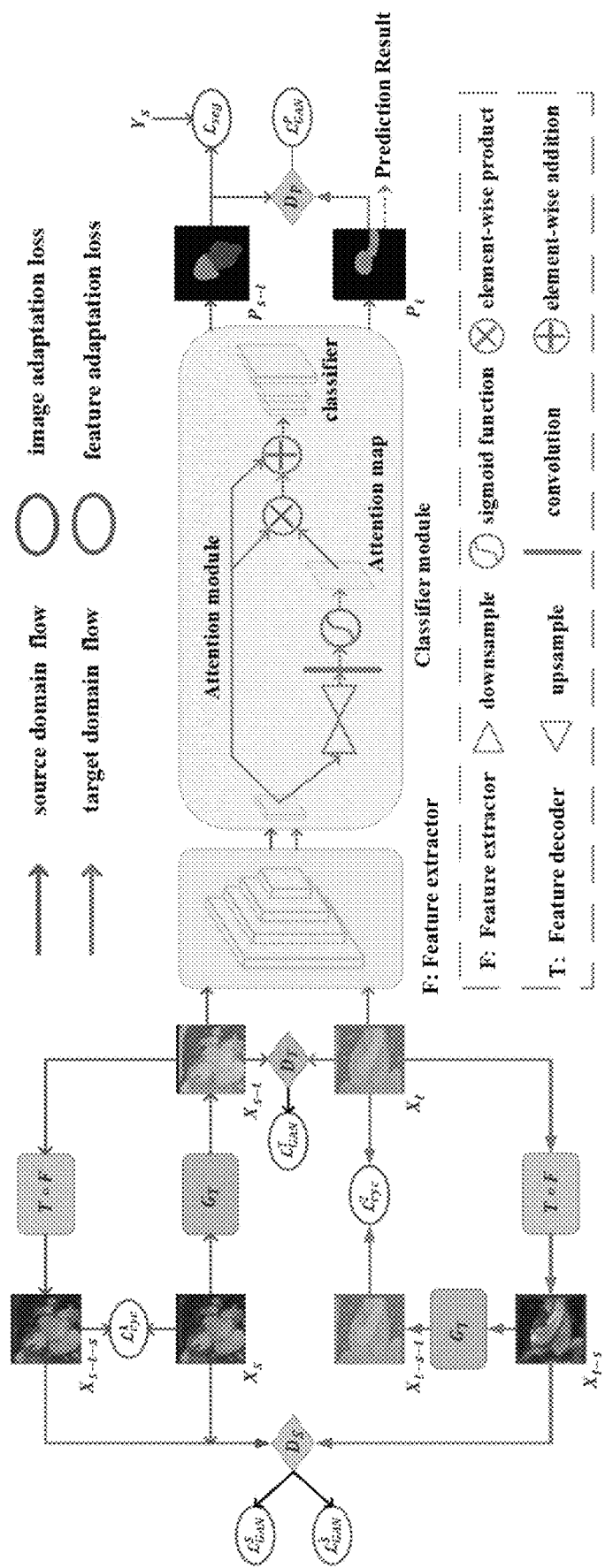
FIG. 1 shows a diagram of the joint learning framework in an embodiment of the present invention.

As shown in FIG. 1, the technical solution used in the present invention is an attention-based joint image and feature adaptive semantic segmentation method, wherein an adaptive joint framework for cross-modal image semantic segmentation domain is constructed, wherein the adaptive joint framework includes an image adaptation procedure and a feature adaptation procedure. The image adaptation procedure and the feature adaptation procedure are adopted to gradually reduce a domain gap between source domain images and target domain images from two aspects of an image appearance and a feature space respectively. Additionally, an attention module is introduced into the feature adaptation procedure to capture key features of important regions. Lastly, the image adaptation procedure and feature adaptation procedure are combined in an end-to-end manner. Specifically, the attention-based joint image and feature adaptive semantic segmentation method contains the following steps:

(1) Using the image adaptation procedure to transform an image style of the source domain images, and without changing an image content, transforming the source domain images into target-like images (also referred as target-domain-like images) with an appearance similar with the target domain images, thus reducing the gap between the source domain image and the target image at the image appearance level.

(2) Using the feature adaptation procedure to align features between the target-like images and the target images in a semantic prediction space and an image generation space respectively, to extract domain-invariant features to further eliminate the domain gap between the target-like image and the real target image.
(3) Introducing the attention module into the feature adaptation procedure to enable it to focus on key image regions with large domain gaps between the target-like image and the target image, and to help it extract attention-aware features to efficiently and accurately reduce the differences between domains. The attention module consists of a pooling layer, an upsampling layer, a convolution layer and a Sigmoid activation layer.
(4) Combining the image adaptation procedure and the feature adaptation procedure in the end-to-end manner to obtain a domain self-adaptive joint learning framework (also referred as domain self-adaptive joint framework), which can benefit both of them mutually while speeding up the training efficiency, and finally obtain a robust and high-performance image segmentation model.

Furthermore, in to step (1), the specific implementation of the image style conversion of the source domain image using an image adaptation procedure is as follows:

1) First, the source domain image $X_S$ is inputted into a generator $G_T$ (generator $G_T$ is composed of 3 convolution layers, 9 residual blocks, 2 deconvolution layers and 1 convolution layer) of a generative adversarial network (GAN) to generate target-domain-like images $X_{s-t}$. Then, a discriminator $D_T$ (discriminator $D_T$ is composed of 3 convolution layers with a step size of 2 and 2 convolution layers with a step size of 1, and the convolution kernel sizes are both 4*4, that is, the convolution kernel size of the 3 convolution layers is 4*4, and the convolution kernel size of the 2 convolution layers is 4*4) corresponding to $G_T$ in the generative adversarial network is used to differentiate $X_{s-t}$, to judge whether the image (target-domain-like image $X_{s-t}$) is a real target domain image or a transformed target-domain-like image. The loss function $\mathcal{L}_{GAN}^T$ of GAN is formulated as shown in Equation (1).

$$\mathcal{L}_{GAN}^T(G_T,D_T,SD,TD)=\mathbb{E}_{X_t\sim TD}[\log D_T(X_t)]+\mathbb{E}_{X_s\sim SD}[\log(1-D_T(G_T(X_s)))] \quad (1)$$

wherein the SD and the TD denote the source domain dataset and the target domain dataset, respectively, and $X_t$ denotes the real target domain image. With the optimization of the generative adversarial network, the loss function converges to zero, i.e., the discriminator $D_T$ cannot determine whether $X_{s-t}$ is the real target domain image or the transformed target-domain-like image. In other words, the appearance of image $X_{s-t}$ is similar to the appearance of target domain image, i.e., the difference between the source domain and target domain is reduced from the image appearance level.

2) Then, similar with the above process, the target domain image $X_t$ is fed into another generator $G_S$ to, to transform the target image $X_t$ (also referred as target domain image $X_t$) into a source-domain-like image $X_{t-s}$. The corresponding discriminator $D_S$ (the structure of the discriminator $D_S$ is same as $D_T$, and the discriminator $D_S$ is composed of 3 convolution layers with a step size of 2 and 2 convolution layers with a step size of 1, and the convolution kernel sizes are both 4*4, that is, the convolution kernel size of the 3 convolution layers is 4*4, and the convolution kernel size of the 2 convolution layers is 4*4) is used to discriminate. Different from the generator $G_T$ in process 1), the generator $G_S$ is composed of two separate network modules, i.e., $G_S$ can be expressed as $G_S = F \circ T$, wherein F and T denote the feature extractor and the feature decoder, respectively (The network structure of the feature extractor F can be expressed as {C, R, P, R, P, 2×R, P, 2×R, 4×R, 2×R, 2×D, 2×C}, wherein {C, R, P, D} denote the convolution layer, the residual block, the maximum pooling layer and the dilated convolution layer, respectively. T consists of 1 convolution layer, 4 residual blocks, 3 deconvolution layers and 1 convolution layer). The loss function in this process is denoted as $\mathcal{L}_{GAN}^S$, as shown in Equation (2).

$$\mathcal{L}_{GAN}^S(F,T,D_S,TD,SD)=\mathbb{E}_{X_s\sim SD}[\log D_S(X_s)]+\mathbb{E}_{X_t\sim TD}[\log(1-D_T(T(F(X_t))))] \quad (2)$$

3) In order to preserve the features of the source domain in the transformed image, image transformation procedure is guided by a cycle-consistency constraint ($\mathcal{L}_{cyc}$). Specifically, the cycle-consistency constraint is divided into a forward consistency constraint and a backward consistency constraint, wherein the forward consistency constraint ensures that the image $X_s$ can return to the image $X_s$ through image transformation after the image $X_s$ is transformed to $X_{s-t}$, as: $X_s \rightarrow G_T(X_s)=X_{s-t} \rightarrow T(F(G_T(X_s)))=X_{s-t-s}$. Similarly, the backward consistency constraint ensures that the image $X_t$ can return to the image $X_t$ through image transformation after the image $X_t$ is transformed to $X_{t-s}$ as: $X_t \rightarrow T(F(X_t))=X_{t-s} \rightarrow G_T(T(F(X_t)))=X_{t-s-t}$. The cycle-consistency constraint $\mathcal{L}_{cyc}$ is shown in Equation (3):

$$\mathcal{L}_{cyc}^1(G_T,F,T,SD)=\mathbb{E}_{X_s\sim SD}[\|T(F(G_T(X_S)))-X_s\|_1]$$

$$\mathcal{L}_{cyc}^2(G_T,F,T,TD)=\mathbb{E}_{X_s\sim SD}[\|G_T(T(F(X_t)))-X_t\|_1]$$

$$\mathcal{L}_{cyc}(G_T,F,T,SD,TD)=\mathcal{L}_{cyc}^1(G_T,F,T,SD)+\mathcal{L}_{cyc}^2(G_T,F,T,TD) \quad (3)$$

wherein $\mathcal{L}_{cyc}^1$ and $\mathcal{L}_{cyc}^2$ denote the forward consistency constraint and the backward consistency constraint, respectively; $\|\cdot\|_1$ denotes the L1 norm;

4) Lastly, after obtaining the target-domain-like image $X_{s-t}$, inputting the target-domain-like image $X_{s-t}$ to the segmentation network for training. Specifically, the segmentation network is composed of the feature extractor F used in the above process and the newly introduced classifier C (consisting of only one layer of 1×1 convolution layer), which can be represented as $F \circ C$. That is, the segmentation network can be represented as $F \circ C$. Then, the segmentation model can be trained by using $X_{s-t}$ and its corresponding label $Y_s$. The objective function of the segmentation model (also referred as image segmentation model) is formulated as Equation (4):

$$\mathcal{L}_{seg}(F,C,SD)=CE(Y_s,P_{s-t})+Dice(Y_s,P_{s-t}) \quad (4)$$

wherein CE(•) represents the cross-entropy loss, Dice(•) represents the Dice loss, and $P_{s-t}$ is the prediction result of the segmentation model.

Furthermore, in step (2), the specific implementation of using the feature adaptation procedure to extract the domain-invariant features is as follows:

1) In order to further reduce the domain gap between the transformed target-domain-like image $X_{s-t}$ and the target domain image $X_t$, aligning the feature space between $X_{s-t}$ and $X_t$ from two aspects, and learn the domain-invariant feature. That is, the feature adaptation procedure aims to align the feature space between both images from two aspects, and learn the domain-invariant feature. Specifically, the feature space corresponding to the two aspects is a semantic prediction space and an image generation space, respectively.

2) In the semantic prediction space, the feature extractor F is used to extract features of $X_{s-t}$ and $X_t$, respectively. The extracted features are fed into the classifier C to perform a pixel-level label prediction so as to obtain a predicted segmentation result of $X_{s-t}$ and $X_t$. Then, an additional discriminator $D_P$ (the structure of the discriminator $D_P$ is same to $D_T$, the discriminator $D_P$ is composed of 3 convolution layers with a step size of 2 and 2 convolution layers with a step size of 1, and the convolution kernel sizes are both 4*4, that is, the convolution kernel size of the 3 convolution layers is 4*4, and the convolution kernel size of the 2 convolution layers is 4*4) is used to discriminate the two prediction results to distinguish the difference between them. The loss function of this process is denoted as $\mathcal{L}_{GAN}^P$, which is formulated as Equation (5):

$$\mathcal{L}_{GAN}^P(F,C,D_P) = \mathbb{E}_{X_{s-t}}[\log D_P(C(F(X_{s-t})))] + \mathbb{E}_{X_t}[\log(1-D_P(C(F(X_t))))] \quad (5)$$

3) In the image generation space, for the generator $G_S$=F ○ T, an auxiliary task is added for the corresponding discriminator $D_S$ to judge whether the generated source domain image is from the generated target domain image $X_{S-t}$ or from the real target domain image $X_t$. The auxiliary task can promote the feature extractor F to extract common features between the source domain and the target domain, thereby reducing the domain gap between the source domain and the target domain at the feature level. The loss function of this process is referred to as $\mathcal{L}_{GAN}^{\tilde{S}}$, which is shown in Equation (6):

$$\mathcal{L}_{GAN}^{\tilde{S}}(F,T,D_S) = \mathbb{E}_{X_{s-t}}[\log D_S(T(F(X_{S-t})))] + \mathbb{E}_{X_t}[\log(1-D_T(T(F(X_t))))] \quad (6)$$

Moreover, in step (3), the specific implementation of introducing the attention module in the feature adaptation procedure is as follows:

1) Considering that different image regions usually have different degrees of domain gaps, and key image regions tend to be more deserving of attention. Therefore, in order to make the segmentation network pay more attention to the regions worthy of attention, the present invention introduces an attention module in feature adaptation procedure to help it (feature adaptation procedure) extract attention-aware features. Specifically, the features extracted by the feature extractor F are firstly inputted to the maximum pooling layer with a size of 2×2 for down-sampling, and then a bilinear interpolation is used for up-sampling.

2) The upsampled result are fed into a convolution layer with a convolution kernel size of 1×1, and is further processed by a Sigmoid activation function to obtain the attention-aware map A(•) (also referred as attention-aware feature map A(•)).

3) Finally, the output result of the attention module is obtained according to the attention-aware map, which is formulated as Equation (7):

$$H(X) = (1+A(X))*F(X) \quad (7)$$

wherein X represents the input image; F(X) represents the features extracted by the feature extractor; A(X) represents the obtained attention-aware map; and H (X) represents the features of the final output. The value range of A(X) is [0, 1], wherein in the lesion image area, the attention weight tends to be 1, and the attention weight of the background area tends to be 0. In other words, the features in the key image region can be enhanced using this attention module, thus improving the performance of the feature adaptation procedure and the final segmentation model.

Furthermore, in step (4), the specific implementation for constructing the domain self-adaptive joint framework in an end-to-end manner is as follows:

1) The domain self-adaptive joint framework is obtained by connecting the image adaptation procedure and the feature adaptation procedure in an end-to-end manner, wherein the end-to-end connection manner is: firstly, inputting a source domain image and a target domain image into the image adaptation procedure to obtain a target-domain-like image and a real target domain image which are similar in image style, and then inputting the target-domain-like image and the real target domain image into the feature adaptation procedure. Finally, the prediction result of image semantic segmentation in the target domain is outputted. Specifically, the image adaptation procedure and the feature adaptation procedure are connected in series, and the feature extractor F is shared in the image adaptation procedure and the feature adaptation procedure. More robust features can be captured by F through a multi-task learning strategy, so that image adaptation (image adaptation procedure) and feature adaptation (feature adaptation procedure) can benefit from each other. The objective function $\mathcal{L}_{all}$ of the joint framework is formulated as Equation (8):

$$\mathcal{L}_{all} = \mathcal{L}_{GAN}^T(G_T,D_T,SD,TD) + \lambda^S \mathcal{L}_{GAN}^S(F,T,D_S,TD,SD) + \lambda_{cyc}\mathcal{L}_{cyc}(G_T,F,T,SD,TD) + \lambda_{seg}\mathcal{L}_{seg}(F,C,SD) + \lambda^P\mathcal{L}_{GAN}^P(F,C,D_P) + \lambda^{\tilde{S}}\mathcal{L}_{GAN}^{\tilde{S}}(F,T,D_S) \quad (8)$$

wherein $\lambda^S$, $\lambda_{cyc}$, $\lambda_{seg}$, $\lambda^P$, $\lambda^{\tilde{S}}$ are balancing parameters used to balance each objective function;

2) With the gradient backward propagation of the joint framework, the update sequence of each module is expressed as $G_T \Rightarrow D_T \Rightarrow F \Rightarrow C \Rightarrow T \Rightarrow D_S \Rightarrow D_P$. Firstly, the generator $G_T$ and the discriminator $D_T$ are updated to obtain a target-domain-like image; next, the feature extractor F is updated to extract features from the target-domain-like image; then, the classifier C and the feature decoder T are updated, and the extracted features are used for semantic segmentation prediction and image reconstruction respectively; Finally, the discriminators $D_S$ and $D_P$ are updated to learn the domain-invariant features between the source domain and the target domain.

The process of realizing the present invention is illustrated by an embodiment as follows:

FIG. 1 shows a schematic diagram of semantic segmentation of cross-modal (MRI→CT) medical images using the attention-based joint image and feature adaptive semantic segmentation method proposed by the present invention. Notably, the source domain image is an MRI image acquired from a 1.5T MRI scanner, which has a 3D resolution of 1×1×1 mm, and the target domain image is an image acquired from a 64-layer CT tomography scanner, which has a resolution of about 0.44×0.44 mm and an average slice thickness of 0.60 mm.

(1) First, the source domain image $X_s$ is passed through the generator $G_T$ to generate a target-like image $X_{s-t}$; then, using the discriminator $D_T$ to discriminate the $X_{s-t}$; then the $X_{s-t}$ is input into $G_S$ to reconstruct the original domain image $X_{s-t-s}$; and finally, the image transformation is guided using the forward consistency constraint. Specifically, the generator $G_T$ is composed of 3 convolution layers, 9 residual blocks, 2 deconvolution layers and a convolution layer; the generator $G_S$ is composed of a feature extractor F and a feature decoder T, the network structure of F can be expressed as {C, R, P, R, P, 2×R, P, 2×R, 4×R, 2×R, 2×D, 2×C}, wherein {C, R, P, D} denote the convolution layer, the residual block, the maximum pooling layer, and the dilated convolution layer, respectively; T consists of 1 convolution layer, 4 residual blocks, 3 deconvolution layers and 1 convolution layer; discriminators $D_T$, $D_S$, and $D_P$ are composed of 3 convolution layers with a step size 2 and 2 convolution layers with a step size 1 (a total of 5 convolution layers with 4*4 convolution kernel size).

(2) Similar to the above process, the target domain image $X_t$ is inputted into the generator $G_S$ to generate the source-domain-like image $X_{t-s}$; then the $X_{t-s}$ is inputted into the discriminator $D_S$ for discriminating; subsequently, the $X_{t-s}$ is inputted into the generator $G_T$ to generate the reconstructed target domain image $X_{t-s-t}$; and finally the image transformation is guided using backward consistency constraints.

(3) The generated $X_{s-t}$ and $X_t$ are fed into the subsequent feature extractor for feature extraction operation to extract local features of the input image, and then inputted into the attention module to obtain attention-aware features, and finally classified by the classifier to generate the prediction results $P_{s-t}$ and Pt. Specifically, the classifier is composed of only one layer of 1×1 convolution layer.

(4) Finally, the predicted results $P_{s-t}$ and Pt are sent to the discriminator $D_P$ for discriminating, and the images $X_{s-t-s}$ (reconstructed from $X_{s-t}$) and $X_{t-s}$ are inputted into $D_S$ to learn domain-invariant features by aligning features in the source domain and the target domain from the semantic prediction space and image generation space, respectively.

(5) The model is trained using 4 NVIDIA Tesla V100 (16G) graphics processors (GPUs), and a medical image segmentation model consisting of a feature extractor, an attention module and a classifier is finally trained through the collaborative optimization of the above joint framework. The trained models are finally stored in a mobile hard disk to conveniently implement medical semantic segmentation functions in different application scenarios.

Specifically, the present method relies on the following electronic devices in its implementation, including:

(1) Processor: To implement the attention-based joint image and feature adaptive semantic segmentation method in the present invention to achieve the desired function, it is necessary to use a central processing unit (CPU) for interpretation of computer instructions and processing of image data, as well as a graphics processing unit (GPU, such as the NVIDIA Tesla V100 used in the embodiment) for high performance execution of computer instructions.

(2) Memory: Inside the computer, internal memory, such as random access memory (RAM) and read-only memory (ROM), is needed for temporary storage of image data in order for the CPU to access and process the image data quickly. After obtaining the semantic segmentation model obtained by the training of the attention-based joint image and feature adaptive semantic segmentation method in the present invention, external memory is needed for saving and utilizing the model.

Figure 2:
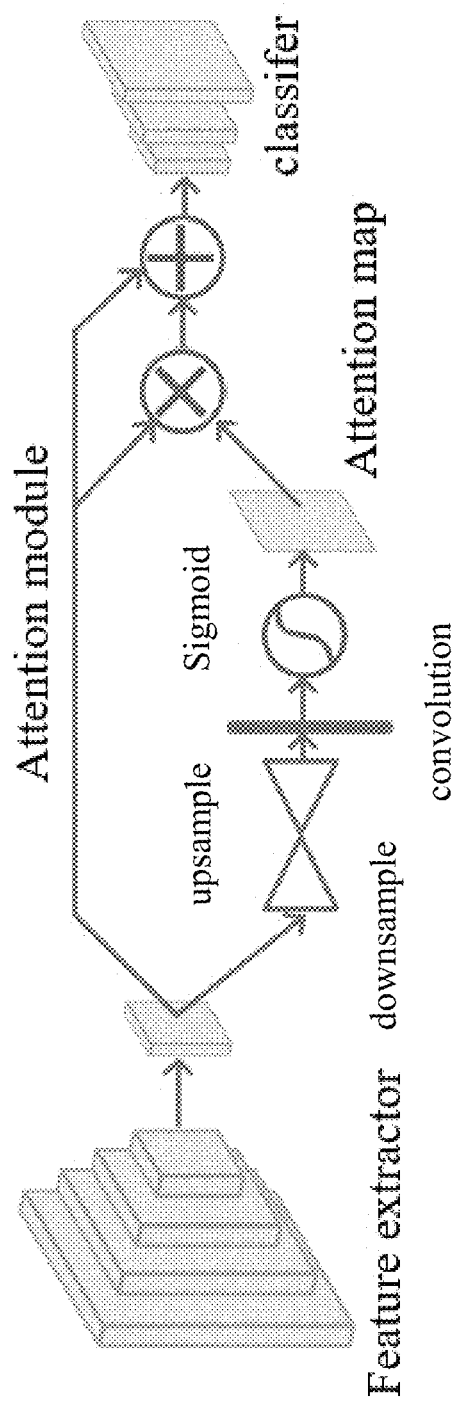
FIG. 2 shows a diagram of the attention module network of the present invention.

FIG. 2 provides a diagram of the network structure of the attention module, and the attention module consists of a pooling layer, an upsampling layer, a convolution layer and a Sigmoid activation layer. Specific details include the following:

(1) The input image is first passed through a maximum pooling layer of size 2×2 for the downsampling operation.

(2) Then an upsampling operation is performed using bilinear interpolation, which is used to recover the resolution of the image.

(3) With a convolution kernel of size 1×1 of the convolution layer, convolution operation is performed on the upsampled images, and then activation is performed by the Sigmoid function to obtain the final attention-aware map.

Figure 3:
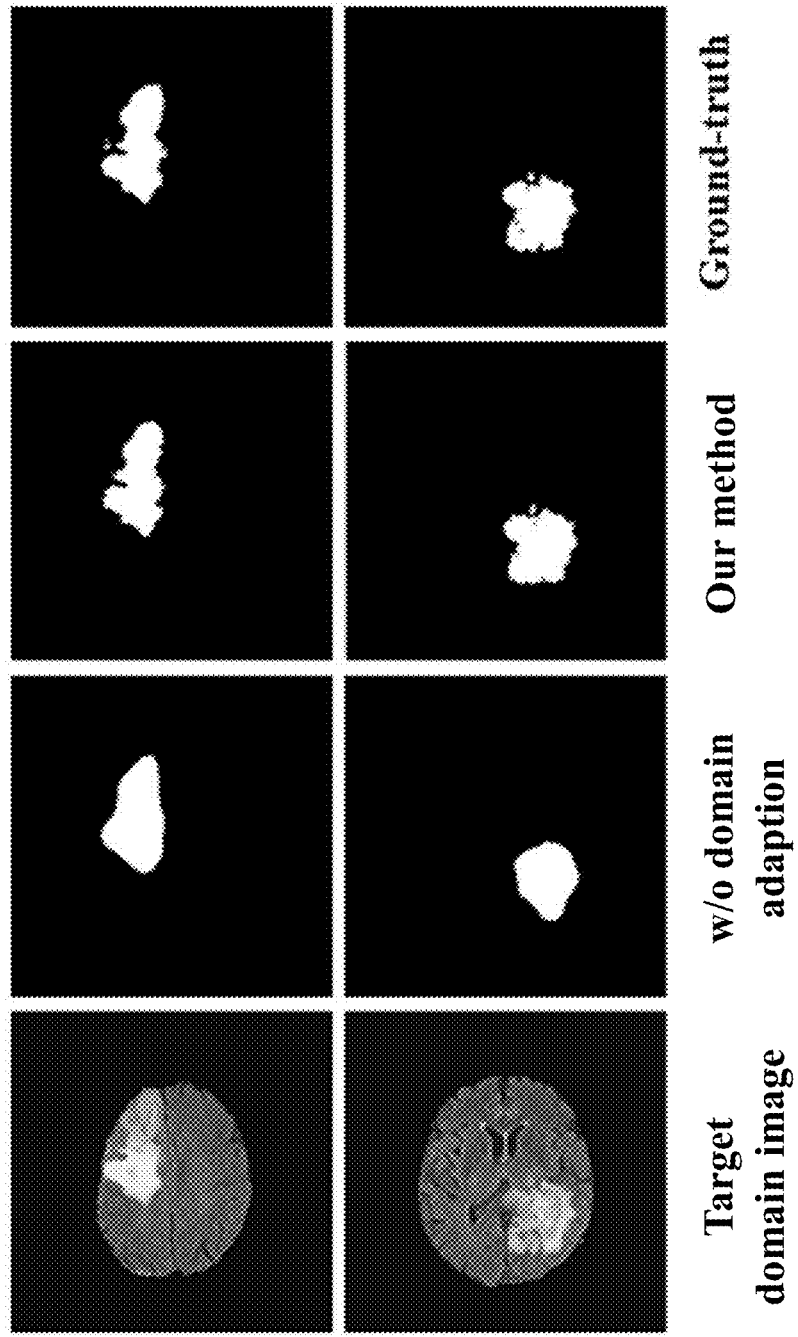
FIGS. 3 and 4 illustrate the results of medical image segmentation for embodiments of the present invention.
Figure 4:
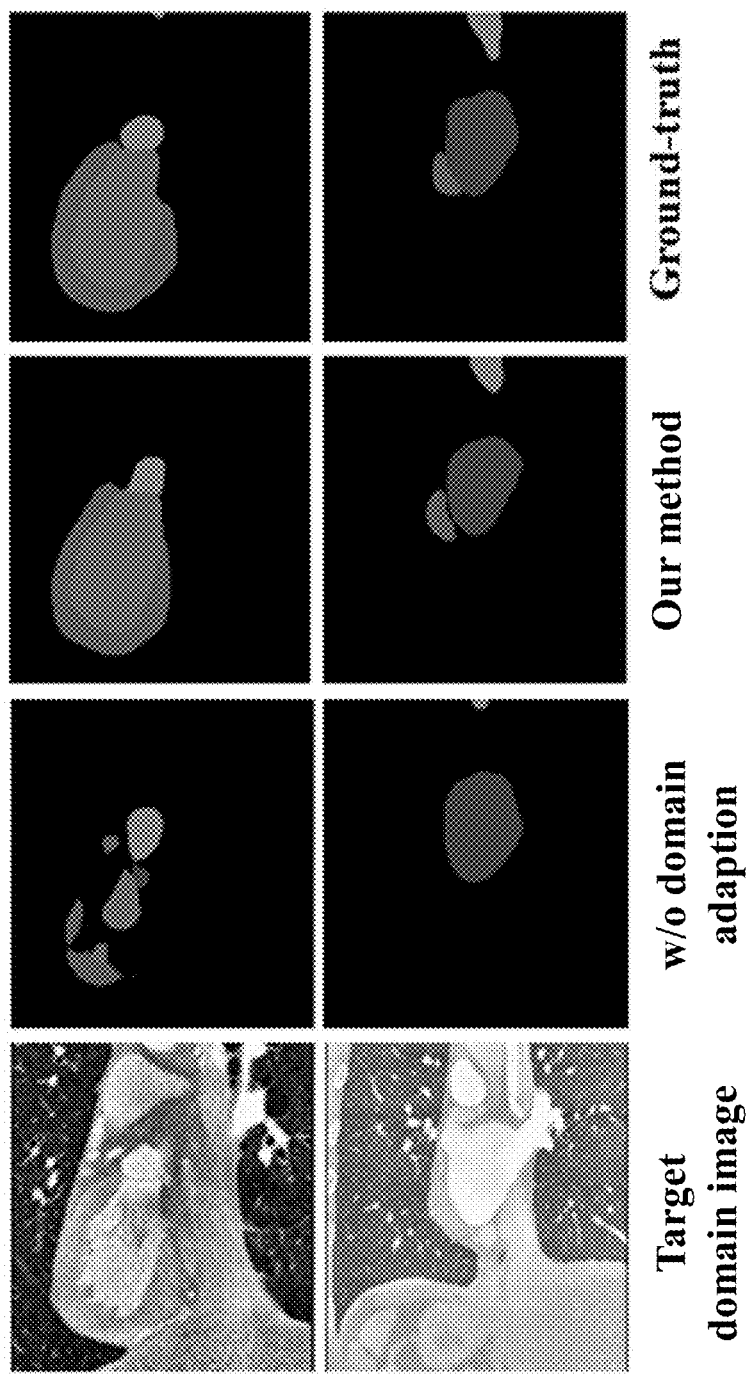

The results of the proposed cross-modal semantic segmentation domain adaptive joint framework for segmentation on medical images are shown in FIGS. 3 and 4. FIG. 3 shows the semantic segmentation results of the proposed method of the present invention on the T2 sequence image migrated from the lung tumor MRI image to the liquid-attenuated inversion sequence (FLAIR) image, where the first column shows the target FLAIR image to be semantically segmented, the second column shows the results of semantic segmentation of the target FLAIR image directly using the semantic segmentation model trained on the T2 sequence image in the source domain, the third column is the result of semantic segmentation model trained using the present method, and the fourth column is the result of semantic segmentation of the target FLAIR image manually annotated. FIG. 4 shows the image segmentation results of the proposed method of the present invention on the migration from the cardiac structural MRI image modality to the CT image modality, where the different columns are displayed similar to the corresponding ones in FIG. 3. It can be found that due to the significant domain gaps between the different modalities, the semantic segmentation of the target domain images obtained by directly using the model trained on the source domain is poor, with significant miss-segmentation. Using the method proposed in the present invention, the semantic segmentation model can effectively mitigate the domain gaps between different modalities, thus significantly reducing the false segmentation and obtaining real segmentation results that are closer to the manual annotation.

It should be understood that the above description of the preferred embodiment is more detailed and should not be considered as a limitation of the scope of protection of the patent of the present invention, and that a person of ordinary skill in the art may, under the inspiration of the present invention and without departing from the scope protected by the claims of the present invention, make substitutions or deformations, all of which fall within the scope of protection of the present invention, and the scope of protection requested by the present invention should be based on the appended claims The scope of protection claimed for the invention shall be governed by the appended claims.

What is claimed is:

1. An attention-based joint image and feature adaptive semantic segmentation method, wherein an adaptive joint framework for cross-modal image semantic segmentation domain is constructed, including an image adaptation procedure and a feature adaptation procedure, the image adaptation procedure and the feature adaptation procedure are adopted to gradually reduce a domain gap between source domain images and target domain images from two aspects of an image appearance and a feature space respectively, additionally, an attention module is introduced into the feature adaptation procedure to capture key features of important regions, lastly, the image adaptation procedure and the feature adaptation procedure are combined in an end-to-end manner, specifically, the method contains the following steps:

step (1), using the image adaptation procedure to transform an image style of the source domain images, and without changing an image content, transforming the source domain images into target-like images with an appearance similar with the target domain images;

step (2), using the feature adaptation procedure to align features between the target-like images and the target images in a semantic prediction space and an image generation space respectively, to extract domain-invariant features;

step (3), introducing the attention module into the feature adaptation procedure, wherein the attention module consists of a pooling layer, an upsampling layer, a convolution layer and a Sigmoid activation layer;

step (4), combining the image adaptation procedure and the feature adaptation procedure in the end-to-end manner to obtain a domain self-adaptive joint framework, with which a high-performance image segmentation model can be robustly trained.

2. The attention-based joint image and feature adaptive semantic segmentation method according to claim 1, wherein in step (1), the specific implementation of using the image adaptation procedure to transform the image style of the source domain images is as follows:

11) firstly, a source domain image $X_S$ is inputted into a generator $G_T$ of a generative adversarial network (GAN) to generate a target-domain-like image $X_{s-t}$, and a discriminator $D_T$ (corresponding to $G_T$) in the generative adversarial network is used to discriminate $X_{s-t}$, to judge whether the image is a real target domain image or a transformed target-domain-like image, and a loss function $\mathcal{L}_{GAN}^T$ of the GAN is formulated as shown in equation (1):

$$\mathcal{L}_{GAN}^T(G_T,D_T,SD,TD) = \mathbb{E}_{X_t \sim TD}[\log D_T(X_t)] + \mathbb{E}_{X_s \sim SD}[\log(1 - D_T(G_T(X_s)))] \quad (1)$$

wherein SD and TD denote the source domain dataset and target domain dataset, respectively, and $X_t$ is the real target domain image;

12) Then, the target domain image $X_t$ is fed into another generator $G_S$, to transform the target image $X_t$ to the source-domain-like image $X_{t-s}$, and a corresponding discriminator $D_S$ is used for discrimination, different from the generator $G_T$ in step 11), the generator $G_S$ is composed of two separate network modules, i.e., $G_S = F \circ T$, wherein F and T denote the feature extractor and a feature decoder respectively, the loss function $\mathcal{L}_{GAN}^S$ in this process is shown in Equation (2):

$$\mathcal{L}_{GAN}^S(F,T,D_S,TD,SD) = \mathbb{E}_{X_s \sim SD}[\log D_S(X_s)] + \mathbb{E}_{X_t \sim TD}[\log(1 - D_T(T(F(X_t))))] \quad (2)$$

13) an image transformation procedure is guided by a cycle-consistency constraint, specifically, the cycle-consistency constraint is divided into a forward consistency constraint and a backward consistency constraint, wherein the forward consistency constraint ensures that the image $X_s$ can return to the image $X_s$ through image transformation after the image $X_s$ is transformed to $X_{s-t}$, denoted as: $X_s \to G_T(X_s) = X_{s-t} \to T(F(G_T(X_s))) = X_{s-t-s}$; similarly, the backward consistency constraint ensures that the image $X_t$ can return to the image $X_t$ through image transformation after the image $X_t$ is transformed to $X_{t-s}$, denoted as: $X_t \to T(F(X_t)) = X_{t-s} \to G_T(T(F(X_t))) = X_{t-s-t}$, the cycle-consistency constraint $\oplus_{cyc}$ is shown in equation (3):

$$\mathcal{L}_{cyc}^1(G_T,F,T,SD) = \mathbb{E}_{X_s \sim SD}[\|T(F(G_T(X_S))) - X_s\|_1]$$
$$\mathcal{L}_{cyc}^2(G_T,F,T,TD) = \mathbb{E}_{X_t \sim TD}[\|G_T(T(F(X_t))) - X_t\|_1]$$
$$\mathcal{L}_{cyc}(G_T,F,T,SD,TD) = \mathcal{L}_{cyc}^1(G_T,F,T,SD) + \mathcal{L}_{cyc}^2(G_T,F,T,TD) \quad (3)$$

wherein $\mathcal{L}_{cyc}^1$ and $\mathcal{L}_{cyc}^2$ denote the forward consistency constraint and the backward consistency constraint, respectively; $\|\cdot\|_1$ denotes the L1 norm;

14) lastly, after obtaining the target-domain-like image $X_{s-t}$, inputting the target-domain-like image $X_{s-t}$ to the segmentation network for training, specifically, the segmentation network is composed of the feature extractor F used in the above process and the newly introduced classifier C, which can be represented as $F \circ C$, then, the segmentation model can be trained by using $X_{s-t}$ and its corresponding label $Y_s$, the objective function of the segmentation model is formulated as Equation (4):

$$\mathcal{L}_{seg}(F,C,SD) = CE(Y_s,P_{s-t}) + \text{Dice}(Y_s,P_{s-t}) \quad (4)$$

wherein CE(•) represents the cross-entropy loss, Dice(•) represents the Dice loss, and $P_{s-t}$ is the prediction result of the segmentation model.

3. The attention-based joint image and feature adaptive semantic segmentation method according to claim 2, wherein the generator $G_T$ is composed of 3 convolution layers, 9 residual blocks, 2 deconvolution layers and 1 convolution layer.

4. The attention-based joint image and feature adaptive semantic segmentation method according to claim 2, wherein the discriminator $D_T$ is composed of 3 convolution layers with a step size of 2 and 2 convolution layers with a step size of 1, and convolution kernel sizes are both 4*4, a network structure of the discriminator $D_S$ is the same as $D_T$.

5. The attention-based joint image and feature adaptive semantic segmentation method according to claim 2, wherein the network structure of the feature extractor F can be represented as {C, R, P, R, P, 2×R, P, 2×R, 4×R, 2×R, 2×D, 2×C}, wherein {C, R, P, D} denote a convolution layer, a residual block, a maximum pooling layer, and a dilated convolution layer, respectively.

6. The attention-based joint image and feature adaptive semantic segmentation method according to claim 2, wherein the feature decoder T comprises 1 convolution layer, 4 residual blocks, 3 deconvolution layers and 1 convolution layer, and the classifier C is only composed of a 1×1 convolution layer.

7. The attention-based joint image and feature adaptive semantic segmentation method according to claim 2, wherein in step (2), the specific implementation of using the feature adaptation procedure to extract the domain-invariant features is as follows:

21) in order to further reduce the domain gap between the transformed target-domain-like image $X_{s-t}$ and the target domain image $X_t$, aligning the feature space between $X_{s-t}$ and $X_t$ from two aspects, and learn the domain-invariant features; specifically, the feature space corresponding to the two aspects is the semantic prediction space and the image generation space, respectively;

22) in the semantic prediction space, the feature extractor F is used to extract features of $X_{s-t}$ and $X_t$, respectively, the extracted features are fed into the classifier C to perform a pixel-level label prediction so as to obtain a predicted segmentation result of $X_{s-t}$ and $X_t$, then, an additional discriminator $D_P$ is used to discriminate the two prediction results to distinguish the difference between them, the loss function of this process is denoted as $\mathcal{L}_{GAN}^P$, which is formulated as equation (5):

$$\mathcal{L}_{GAN}^P(F,C,D_P) = \mathbb{E}_{X_{s-t}}[\log D_P(C(F(X_{s-t})))] + \mathbb{E}_{X_t}[\log(1-D_P(C(F(X_t))))] \quad (5)$$

23) in the image generation space, for the generator $G_S = F \circ T$, an auxiliary task is added for the corresponding discriminator $D_S$ to judge whether the generated source domain image is from the generated target domain image $X_{s-t}$ or from the real target domain image $X_t$; the auxiliary task can promote the feature extractor F to extract common features between a source domain and a target domain, thereby reducing the domain gap between the source domain and the target domain at a feature level, the loss function of this process is referred to as $\mathcal{L}_{GAN}^{\tilde{S}}$, which is shown in equation (6):

$$\mathcal{L}_{GAN}^{\tilde{S}}(F,T,D_S) = \mathbb{E}_{X_{s-t}}[\log D_S(T(F(X_{s-t})))] + \mathbb{E}_{X_t}[\log(1-D_T(T(F(X_t))))] \quad (6)$$

8. The attention-based joint image and feature adaptive semantic segmentation method according to claim 7, wherein the discriminator $D_P$ is composed of 3 convolution layers with a step size of 2 and 2 convolution layers with a step size of 1, and convolution kernel sizes are both 4*4.

9. The attention-based joint image and feature adaptive semantic segmentation method according to claim 7, wherein in step (3), the specific implementation of introducing the attention module in the feature adaptation procedure is as follows:

31) the attention module is introduced in the feature adaptation procedure to help it extract attention-aware features, specifically, the features extracted by the feature extractor F are firstly inputted to a maximum pooling layer with a size of 2×2 for down-sampling, and then a bilinear interpolation is used for up-sampling;

32) the upsampled result are fed into a convolution layer with a convolution kernel size of 1×1, and is further processed by a Sigmoid activation function to obtain an attention-aware map $A(\bullet)$;

33) finally, an output result of the attention module is obtained according to the attention-aware map, which is formulated as equation (7):

$$H(X) = (1+A(X))*F(X) \quad (7)$$

wherein X represents an input image; F(X) represents features extracted by the feature extractor; A(X) represents the obtained attention-aware map; and H(X) represents features of a final output, the value range of A(X) is [0, 1], wherein in a lesion image area, an attention weight tends to be 1, and the attention weight of a background area tends to be 0.

10. The attention-based joint image and feature adaptive semantic segmentation method according to claim 9, wherein in step (4), the specific implementation for constructing the domain self-adaptive joint framework in the end-to-end manner is as follows:

41) the domain self-adaptive joint framework is obtained by connecting the image adaptation procedure and the feature adaptation procedure in the end-to-end manner, wherein the end-to-end connection manner is: firstly, inputting a source domain image and a target domain image into the image adaptation procedure to obtain a target-domain-like image and a real target domain image which are similar in the image style, and then inputting the target-domain-like image and the real target domain image into the feature adaptation procedure, finally, a prediction result of image semantic segmentation in the target domain is outputted, specifically, more robust features can be captured by F through a multi-task learning strategy, so that an image adaptation and an feature adaptation can benefit from each other, the objective function $\mathcal{L}_{all}$ of the joint framework is formulated as equation (8):

$$\mathcal{L}_{all} = \mathcal{L}_{GAN}^T(G_T,D_T,SD,TD) + \lambda^S \mathcal{L}_{GAN}^S(F,T,D_S,TD,SD) + \lambda_{cyc}\mathcal{L}_{cyc}(G_T,F,T,SD,TD) + \lambda_{seg}\mathcal{L}_{seg}(F,C,SD) + \lambda^P \mathcal{L}_{GAN}^P(F,C,D_P) + \lambda^{\tilde{S}}\mathcal{L}_{GAN}^{\tilde{S}}(F,T,D_S) \quad (8)$$

wherein $\lambda^S$, $\lambda_{cyc}$, $\lambda_{seg}$, $\lambda^P$, $\lambda^{\tilde{S}}$ are balancing parameters used to balance each objective function;

42) with a gradient backward propagation of the joint framework, an update sequence of each module is expressed as $G_T \Rightarrow D_T \Rightarrow F \Rightarrow C \Rightarrow T \Rightarrow D_S \Rightarrow D_P$: firstly, the generator $G_T$ and the discriminator $D_T$ are updated to obtain the target-domain-like image; next, the feature extractor F is updated to extract features from the target-domain-like image; then, the classifier C and the feature decoder T are updated, and the extracted features are used for a semantic segmentation prediction and an image reconstruction respectively; finally, the discriminators $D_S$ and $D_P$ are updated to learn the domain-invariant features between the source domain and the target domain.

11. The attention-based joint image and feature adaptive semantic segmentation method according to claim 1, wherein the image segmentation model is trained using 4 NVIDIA Tesla V100 16G graphics processors (GPUs).

* * * * *